June 16, 1936. V. F. ZAHODIAKIN 2,044,273
PISTON RING
Filed March 24, 1934

INVENTOR
Victor F. Zahodiakin
BY Wood & Wood
ATTORNEYS

Patented June 16, 1936

2,044,273

UNITED STATES PATENT OFFICE 2,044,273

PISTON RING

Victor F. Zahodiakin, Cincinnati, Ohio, assignor to The Z-Flex Piston Ring Corporation, a corporation of New Jersey Application March 24, 1934, Serial No. 717,202

8 Claims. (Cl. 309—24)

This invention relates to improvements in piston rings of the character adapted for use in internal combustion engines and the like, and is particularly directed to improvements in the type of ring disclosed and claimed in my Patent No. 1,957,927, issued May 18, 1934.

The ring as disclosed in said application is formed of flexible sheet or spring plate material. Fundamentally the strip of material forming the ring is corrugated to provide for oil flow passageways through the ring reducing explosive pressure against the internal periphery of the ring when used as a compression ring, and to provide for proper edge contact with the cylinder wall. The ring thus formed is quite flexible, both circumferentially and radially. That is to say, it conforms readily and accurately to local and general variations in the wall of the cylinder. The advantages of this type of ring are fully set forth in the mentioned application.

It is an object of the present invention to provide an improved ring which has the same underlying and fundamental advantages as the ring of the first application, such as great flexibility, durability, light weight, better oil control, and proof against carbon, whereby it is highly effective for preventing leakage of oil into the combustion chamber or loss of compression.

Specifically, it is a further object to provide a fabricated ring in which corrugated or substantially radially fluted ring sections are superimposed and joined to form an integral one-piece structure or a structure which is cellular, or which includes the transverse cells forming oil passageways. It will be apparent that the fabricated ring as herein disclosed is extremely easy to manufacture.

In the ring of the aforesaid application, the corrugations as formed and prior to insertion of the ring in the cylinder are open alternately at the top and bottom of the ring. When the ring is pressed into position in the piston groove and within the cylinder wall, the transverse walls of the ring, or walls of the corrugation, are in substantial abutment or minutely spaced, and form the cross cells or tubes above mentioned having slight gaps.

It is a further object of this invention to provide that the oil passages or tubes in the ring do not have gaps or slits in their sides, therefore preventing escape of oil from the cells as would occur when a vacuum is formed above the ring during reciprocation of the piston.

It is a further object to provide a ring of this cellular character in which the cells may be of any circumferential dimension desired as may be necessary for the proper oil flow and oil control as well as for proper area of edge contact with the cylinder wall.

It is a further object to provide that the cells of the ring are independently flexible, whereby the free flexing of the walls thereof breaks up carbon deposits.

It is a further object to provide that the ring sections making up the fabricated ring combine to provide circumferentially arranged cells having relatively sharp external cross edges which abut to form perfectly flush unbroken flat top and bottom surfaces for the ring.

It is a further object to provide a ring formed of flexible strip material providing passageways opening at the inner and outer peripheries of the ring, wherein the outer edges of the cross walls forming the passageways are grooved for the purpose of reducing frictional contact with the cylinder wall a predetermined amount.

Other objects and further advantages will be more fully apparent from a description of the accompanying drawing, in which.

The rings disclosed in this application are fabricated structures. They are formed of superimposed ring sections of flat circular stock of spring steel or flexible plate material. In each case the finished article provides cells opening at the inner and outer peripheries of the ring.

Figure 1:
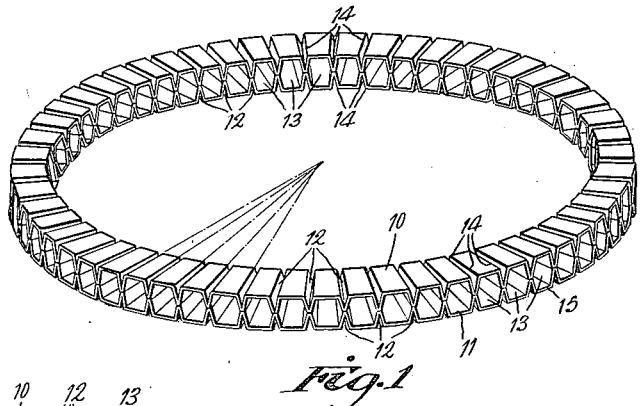
Figure 1 is a perspective view of the assembled fabricated piston ring, showing it apart from the piston and in its fully expanded position.
Figure 2:
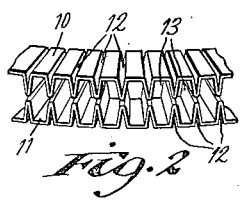
Figure 2 is a fragmentary perspective view of the parts of the ring of Figure 1, showing them adjacently disposed prior to abutment and fusion.
Figure 3:
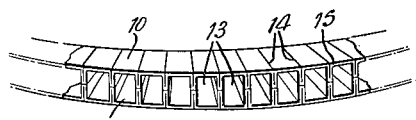
Figure 3 is a fragmentary perspective view of a portion of the ring, showing it in its compressed position as it appears when mounted in the piston and cylinder.

Referring specifically to Figures 1 to 3 of the drawing, the ring sections, upper and lower respectively, are indicated at 10 and 11. A strip of spring steel or flexible plate material is formed to provide V-shaped corrugations or flutes 12. The upper and lower rings are duplicates. When placed together for assembly, as shown in Figure 2, the tips of the corrugations are adjacently disposed and abutted. The preferred method of securing the sections together to form an integral one-piece ring is to attach electrodes to the respective rings with the rings pressed into absolute contact with all corrugations abutting, whereby the tips of the corrugations are fused together and merge to form the independent cells 13 having unbroken cross walls.

Now in the fabricated form or fully expanded form prior to adaptation to use, the cells are hexagonal. When the ring is placed in position the cells become approximately rectangular by virtue of the fact that the walls of the V-shaped corrugations come together with the walls of each corrugation in perfectly flat full abutment. The V-shaped corrugations are constructed to provide relatively sharp cross edges 14 so that when the ring is compressed into position shown in Figure 3, the top and bottom surfaces of the ring are continuous and without undulation. Although it has been stated that the cells as initially formed are hexagonal, it will be borne in mind that the circumferential width of these cells can be varied at will, depending on the amount of edge contact desired for engagement with the cylinder wall. The edges referred to are indicated at 15.

The construction of the average piston is well understood and for that reason the drawing does not incorporate a showing thereof. The present piston ring is adapted to be placed in the conventional piston groove which incorporates oil flow passageways, leading from the vertical wall of the groove into the interior of the piston for circulation back to the crank case.

Figure 4:
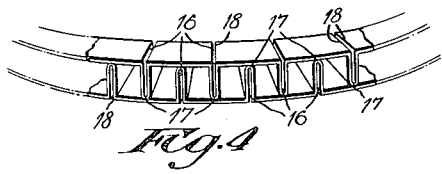
Figure 4 is a fragmentary perspective view of a portion of a modified ring.
Figure 5:
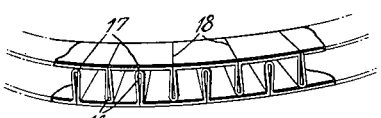
Figure 5 is a fragmentary perspective view of the ring of Figure 4, showing it as it appears when installed.

In the modified form shown in Figures 4 and 5, corrugated ring sections are provided of duplicate character as in the preceding form. The corrugations 16 are approximately U-shaped as shown. In this form instead of having the corrugation in abutment, that is to say, instead of having the tips of the corrugations adjacent, the corrugations are made of greater height or lateral projection, and as the ring sections are put together, the corrugations of a particular ring section are interposed or projected between the corrugations of the other ring and contact the flat horizontal portion of the ring. This produces rectangular cells. The rings are spot welded together at the points of contact between the corrugations and the adjacent ring section and the cells or tubes accordingly have an entirely unbroken wall structure.

In Figure 4, the ring is shown in fully expanded position prior to insertion or adaptation to use. When placed in use as shown in Figure 5, the corrugations flex on the rounded outer ends 17 thereof and the relatively sharp cross edges 18 lying in the plane of the flat portion of the ring section abut to provide the aforesaid flush surface without undulations. Thus through the provision of duplicate ring sections abutted and spot welded either by contact of the corrugations tip to tip or contact of the corrugations with the flat wall of the opposite ring, a cellular integral one-piece ring is provided having all the advantages heretofore set forth.

Figures 6, 7:
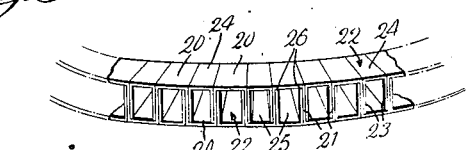
Figure 6 is a fragmentary perspective view of a ring of a further modification.
Figure 7 is a fragmentary perspective view of the ring of Figure 6, showing it as it appears when in use.

Referring to Figures 6 and 7, it will be observed that the ring may be formed of a single continuous corrugated ring and a series of inserts. The main ring is of zigzag structure or corrugated to provide substantially U-shaped cross grooves 19 alternately at opposite sides of the ring. This ring therefore provides intermittent horizontal walls 20 in respective planes forming the top and bottom walls of the ring. The side walls 21 of each cross groove are inclined.

In each groove a channel element 22 having parallel side walls 23 is fixed. These elements as related to the grooves are inverted so that their cross walls 24 are disposed in the horizontal planes of the top and bottom walls of the main ring section respectively, thus substantially filling out these walls. The three walls 23, 23 and 24, of the U-shaped inserts and the adjacent wall 20 of the main ring form cross tubes or cells 25 opening at the inner and outer peripheries of the ring. These tubes or cells are for the purpose of delivering the oil from the wall of the cylinder through the ring and through the piston as previously described. The ends of the arms of the channel inserts 22 are spot welded in the corners of the corrugations as at 26.

Now as seen in Figure 6, there are spaces 27 between the side walls 23 of the inserts and the inclined walls 21 of the main ring. When the ring is compressed and installed, its position is as shown in Figure 7. In this position the spaces are closed and the top and bottom walls of the ring are substantially continuous. It will be apparent that the oil tubes 25 have unbroken walls.

When the ring is compressed into its working position the flexible walls 21 constantly tend to assume the inclined position shown in Figure 6, and for this reason cause circumferential and radial expansive forces for maintaining the ring in snug contact with the cylinder wall.

Figure 8:
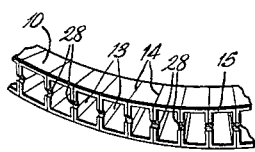
Figure 8 is a fragmentary perspective view of a modified ring in which the outer edges of the cross walls are grooved.

Referring to Figure 8, it will be noted that grooves 28 may be provided in the outer peripheral edge of the ring specifically in the vertical walls between the passageways. These grooves reduce the area of edge contact with the cylinder wall and afford a means for controlling the amount of contact since they can be made of any width.

Having described my invention, I claim:

1. As an article of manufacture, a piston ring fabricated of sheet material, comprising, superimposed corrugated ring sections having their corrugations extended toward each other and in tip abutment to provide passageways open at the inner and outer peripheries of the ring, said sections fused together.

2. As an article of manufacture, a piston ring fabricated of sheet material, comprising, overlaid ring sections of sheet material, said ring sections including substantially radially formed flutes therein spaced apart to leave substantial straight portions of the ring sections, the flutes of said ring sections disposed toward each other, and said rings disposed in abutment and secured together to form a series of cross tubes opening at the inner and outer peripheries of the ring.

3. As an article of manufacture, a piston ring fabricated of sheet material, comprising, superimposed corrugated ring sections joined together with the corrugations of each ring section extended toward each other and the tips of the corrugation of each ring abutting the next ring, thereby forming cross tubes opening at the inner and outer peripheries of the ring.

4. As an article of manufacture, a piston ring fabricated of sheet material, comprising, superimposed ring sections having V-shaped corrugations, said corrugations of each ring section extended toward the corrugations of the other ring section and secured in tip to tip abutment to provide entirely closed cross tubes in the ring opening at the inner and outer peripheries of the ring.

5. As an article of manufacture, a piston ring fabricated of sheet material, comprising, a ring section having substantially rectangular corrugations, the side walls thereof slightly inclined from 90 degrees, a channel element fixed in inverted position in each corrugation, thereby forming cross tubes opening at the inner and outer peripheries of the ring, said inclined walls adapted to move into positions parallel with the side walls of the channel when the ring is compressed.

6. As an article of manufacture, a piston ring fabricated of sheet material, comprising, a ring having substantially rectangular corrugations therein, channel elements secured in said corrugations in inverted positions, whereby closed cross tubes are provided in the ring.

7. As an article of manufacture, a piston ring fabricated of sheet material, comprising, superimposed ring sections having V-shaped corrugations, the corrugations of each ring section extended toward the other ring section and said sections secured together at the tips of the corrugations to provide entirely closed cross tubes in the ring opening at the inner and outer peripheries of the ring, each of said corrugations having relatively sharp cross edges adapted to abut when the ring is compressed.

8. As an article of manufacture, a flexible and resilient circumferentially extensible and compressible piston ring fabricated of sheet material and provided with a series of passageways open at the inner and outer peripheries of said ring, each of said passageways having entirely continuous and integral side walls.

VICTOR F. ZAHODIAKIN.